(12) United States Patent
Johansson

(10) Patent No.: US 11,897,541 B2
(45) Date of Patent: Feb. 13, 2024

(54) METHOD FOR GUIDING A VEHICLE

(71) Applicant: VOLVO TRUCK CORPORATION, Gothenburg (SE)

(72) Inventor: Daniel Johansson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/350,315

(22) Filed: Jun. 17, 2021

(65) Prior Publication Data

US 2022/0001923 A1 Jan. 6, 2022

(30) Foreign Application Priority Data

Jul. 3, 2020 (EP) .................................... 20184002

(51) Int. Cl.
*B62D 15/02* (2006.01)

(52) U.S. Cl.
CPC .................. *B62D 15/026* (2013.01)

(58) Field of Classification Search
CPC .. B62D 15/025; B62D 15/0285; B62D 12/00; B62D 15/024; B62D 15/027; B62D 21/186
See application file for complete search history.

(56) References Cited

U.S. PATENT DOCUMENTS

| 7,792,328 B2 * | 9/2010 | Albertson | B60W 40/09 701/1 |
| 9,607,243 B1 * | 3/2017 | Brualla | G06F 18/28 |
| 2005/0222761 A1 * | 10/2005 | Uyeki | G08G 1/096716 340/995.13 |
| 2007/0262863 A1 * | 11/2007 | Aritsuka | H04B 17/27 370/254 |

(Continued)

FOREIGN PATENT DOCUMENTS

| CN | 105973231 A | * | 9/2016 |
| CN | 106406784 A | * | 2/2017 |

(Continued)

OTHER PUBLICATIONS

European Search Report dated Dec. 9, 2020 in corresponding European Patent Application No. 20184002.2, 5 pages.

*Primary Examiner* — Redhwan K Mawari
(74) *Attorney, Agent, or Firm* — Venable LLP; Jeffri A. Kaminski

(57) ABSTRACT

The invention relates to a method for guiding a vehicle (1) during reversing along a desired travelling path (TP), wherein the guiding is based on a lateral offset (y) between a preview point (P) located at a preview distance (Pd) behind the vehicle (1) and the desired travelling path (TP), the method comprising:
determining (S1) a curvature of the desired travelling path (TP) behind the vehicle (1);

(Continued)

adaptively adjusting (S2) the preview distance (Pd) in dependence on the determined curvature, thereby adaptively adjusting the preview point (P); and guiding (S3) the vehicle (1) along the desired travelling path (TP) by use of the lateral offset (y) between the adjusted preview point (P) and the desired travelling path (TP). The present invention further relates to a control unit (100), to a vehicle (1), to a computer program and to a computer readable medium.

17 Claims, 4 Drawing Sheets

(56) References Cited

U.S. PATENT DOCUMENTS

| | | | | |
|---|---|---|---|---|
| 2010/0286872 | A1* | 11/2010 | Endo | B62D 15/027 |
| | | | | 701/41 |
| 2012/0213404 | A1* | 8/2012 | Steiner | G06F 16/5838 |
| | | | | 382/218 |
| 2014/0139667 | A1* | 5/2014 | Kang | H04N 23/611 |
| | | | | 348/143 |
| 2015/0235110 | A1* | 8/2015 | Curtis | G06V 20/30 |
| | | | | 382/224 |
| 2016/0246304 | A1* | 8/2016 | Canoy | G01M 17/00 |
| 2018/0128622 | A1* | 5/2018 | Alataas | G06F 3/167 |
| 2018/0356248 | A1* | 12/2018 | Eno | G01C 21/3679 |
| 2019/0265058 | A1* | 8/2019 | Lear | G01C 21/3476 |
| 2019/0375450 | A1* | 12/2019 | Medagoda | B62D 15/0285 |
| 2020/0001862 | A1* | 1/2020 | Luo | G05D 1/0212 |
| 2020/0073357 | A1* | 3/2020 | Hioki | G05B 19/19 |
| 2021/0061374 | A1* | 3/2021 | Hudson | B62D 21/186 |

FOREIGN PATENT DOCUMENTS

| | | | | |
|---|---|---|---|---|
| CN | 107264621 | A * | 10/2017 | B62D 6/0001 |
| CN | 108116497 | A * | 6/2018 | B62D 15/024 |
| CN | 108534777 | A * | 9/2018 | |
| CN | 108973998 | A * | 12/2018 | B60W 30/14 |
| CN | 109521761 | A * | 3/2019 | B60W 30/12 |
| CN | 107543560 | A * | 1/2023 | G01C 21/36 |
| DE | 102008043675 | A1 | 5/2010 | |
| DE | 102016107767 | A1 * | 11/2016 | G06F 16/5846 |
| EP | 1847442 | A2 | 10/2007 | |
| EP | 2644477 | A1 | 10/2013 | |
| FR | 3020705 | A1 * | 11/2015 | B61L 25/08 |
| GB | 2425858 | A * | 11/2006 | G01C 21/32 |
| JP | 5853693 | B2 * | 2/2016 | |
| JP | 2018039293 | A * | 3/2018 | |
| JP | 2018039293 | A * | 3/2023 | |
| RU | 2748763 | C1 * | 5/2021 | |
| WO | WO-2006039389 | A2 * | 4/2006 | G01C 21/3647 |
| WO | WO-2015138181 | A1 * | 9/2015 | A61F 13/213 |

* cited by examiner

METHOD FOR GUIDING A VEHICLE

TECHNICAL FIELD

The invention relates to a method for guiding a vehicle during reversing along a desired travelling path. The invention also relates to a control unit for guiding a vehicle during reversing along a desired travelling path, to a vehicle, to a computer program and to a computer readable medium.

The invention can be applied in heavy-duty vehicles, such as trucks, buses and construction equipment. Although the invention will mainly be described with respect to an articulated truck combination, the invention is not restricted to this particular vehicle, but may also be used in other vehicles such as other trucks, buses, passenger cars and working machines, including but not limited to wheel loaders, dump trucks, excavators etc.

BACKGROUND

Reversing of a vehicle, in particular reversing of a vehicle combination comprising one or more articulation joint(s), may be a difficult task for a driver. This may be especially difficult when reversing in more narrow areas.

Therefore, especially for vehicle combinations comprising one or more articulation joint(s), assistance systems have been proposed which support the driver during reversing. The assistance systems may for example be designed to provide steering support during reversing, as well as braking and/or propulsion support. It is also known to provide reverse assistance systems which automatically reverse a vehicle along a desired travelling path. The reversing along the desired travelling path may be performed by use of a determined lateral offset between a predefined fixed preview point located at a distance behind the vehicle and the desired travelling path.

Even though it is known to use reverse assistance systems for reversing e.g. a vehicle combination along a desired travelling path, there is still a strive to provide further improved reverse assistance systems.

SUMMARY

In view of the above, an object of the present invention is to provide an improved method for guiding a vehicle during reversing along a desired travelling path. Another object of the present invention is to provide an improved control unit for guiding a vehicle during reversing along a desired travelling path, a vehicle, a computer program and/or a computer readable medium.

According to a first aspect of the invention, the object is achieved by a method according to claim 1. According to a second aspect of the invention, the object is achieved by a control unit according to claim 14. According to a third aspect of the invention, the object is achieved by a vehicle according to claim 15. According to a fourth aspect of the invention, the object is achieved by a computer program according to claim 16. According to a fifth aspect of the invention, the object is achieved by a computer readable medium according to claim 17.

According to the first aspect, the object is achieved by a method for guiding a vehicle during reversing along a desired travelling path, wherein the guiding is based on a lateral offset between a preview point located at a preview distance behind the vehicle and the desired travelling path, the method comprising:

determining a curvature of the desired travelling path behind the vehicle;

adaptively adjusting the preview distance in dependence on the determined curvature, thereby adaptively adjusting the preview point; and guiding the vehicle along the desired travelling path by use of the lateral offset between the adjusted preview point and the desired travelling path.

Accordingly, adaptively adjusting the preview point by adaptively adjusting the preview distance means that the location of the preview point with respect to the vehicle is adaptively adjusted in dependence on the determined curvature.

By the provision of the method as disclosed herein, improved guiding during reversing is achieved. In fact, the present invention is based on a realization of the inventor that the guiding along the desired travelling path can be improved by dynamically adjusting, i.e. adaptively adjusting, the preview distance in dependence on the curvature of the desired travelling path while reversing. More particularly, by dynamically adjusting the preview distance in dependence on the curvature of the desired travelling path while reversing, the following of the travelling path during guiding of the vehicle can be improved. Purely by way of example, reversing in a tight curvature may benefit from having a relatively short preview distance, while reversing in a small curvature may benefit from having a relatively long preview distance. A longer preview distance with respect to a relatively small curvature may imply improved vehicle stability during reversing. A shorter preview distance with respect to a relatively tight curvature may imply improved following of the desired travelling path. As such, and according to an example embodiment, the preview distance may be adaptively adjusted so that it increases with decreasing curvature of the desired travelling path and decreases with increasing curvature of the desired travelling path.

Preferably, the method as disclosed herein is continuously performed while the vehicle is reversing along the desired travelling path, such as continuously performed in a control loop.

Guiding of a vehicle, which also may be referred to as path tracking of a vehicle, as used herein means that any type of instruction is provided which instructs the vehicle and/or a user of the vehicle to perform an action, or a series of actions, so that the vehicle follows the desired travelling path while reversing along the desired travelling path.

Optionally, the curvature may be determined based on a plurality of points of the desired travelling path. Thereby a more correct value for the curvature may be provided, implying improved adjustment of the preview distance so that the following by guiding the vehicle along the desired travelling path can be further improved.

Optionally, determining the curvature may comprise:

determining a first curvature at a first point of the desired travelling path which is associated with the preview point, determining a second curvature at a second point of the desired travelling path which is associated with a rear-most wheel axle of the vehicle.

The first and second points are thus different points of the desired travelling path. By determining the curvature based on the first and second points, improved adjustment of the preview distance may be achieved, since it provides more relevant information about how the curvature changes along the desired travelling path. It has also been realized that the curvatures associated with the preview point and the rearmost wheel axle, respectively, may beneficially be used for providing more relevant information about the desired travelling path. For example, the second point may be provided closer to the rear-most wheel axle compared to the first point, and the first point may be provided closer to the preview point compared to the second point.

Still optionally, the first point of the desired travelling path may be a closest point to the preview point. Still optionally, the second point of the desired travelling path may be a closest point to the rear-most wheel axle of the vehicle. It has namely been realized that the curvature closest, or at least substantially closest, to the rear-most wheel axle and/or the curvature closest, or at least substantially closest, to the preview point, may provide more relevant information about how the curvature changes along the desired travelling path.

Optionally, the method may further comprise selecting the largest of the first curvature and the second curvature as the curvature to be used for adaptively adjusting the preview distance. This approach has been found to provide an efficient method of determining the curvature to be used, implying a robust algorithm requiring less complex and complicated computer resources. Still further, by selecting the largest curvature as the curvature to be used, improved adjustment of the preview distance may be provided, implying improved following of the desired travelling path. For example, if the first curvature is the largest, the preview distance may be decreased in dependence of the first curvature to be prepared for the upcoming curvature. On the other hand, if the second curvature is the largest, the preview distance may be adjusted (decreased/increased/maintained) in dependence on the second curvature until the first curvature becomes larger than the second curvature.

As a consequence, when the second curvature is the largest, the preview distance may be adjusted in dependence on the closer and larger second curvature, implying improved following of the desired travelling path when e.g. the second curvature is decreasing when travelling along the desired travelling path.

Optionally, the preview distance may be adaptively adjustable in dependence on a difference between the first curvature and the second curvature. This approach has been found to be an alternative or additional efficient way of adaptively adjusting the preview distance in dependence on the curvature of the desired travelling path. For example, the difference between the first curvature and the second curvature may provide more relevant information about a change of the curvature along the desired travelling path. This approach has also been found to provide an efficient method, implying a robust algorithm requiring less complex and complicated computer resources.

Optionally, the preview distance may be adaptively adjustable between a predefined maximum and/or minimum value. In fact, it has also been realized that the preview distance may advantageously be not too long and/or too short in order for the guiding to function properly. Too short and/or too long preview distance may lead to impaired guiding of the vehicle, or even a complete interruption of the guiding. For example, too long preview distance may lead to that the vehicle is shortcutting when reversing in a curvature, and too short preview distance may lead to an oscillating movement of the vehicle, especially in straight sections of the desired travelling path. Further, using a predefined maximum and/or minimum value implies a more robust algorithm requiring less complex and complicated computer resources.

Optionally, the adaptively adjustable preview distance may have a linear dependency on the determined curvature. A linear dependency may imply a smooth adjustment of the preview distance when the vehicle is guided along the desired travelling path. Further, a linear dependency may also imply a more robust algorithm requiring less complex and complicated computer resources.

Optionally, the guiding of the vehicle along the desired travelling path may comprise determining a desired steering intervention of the vehicle to be used in order to follow the desired travelling path, wherein the desired steering intervention is based on the lateral offset between the adjusted preview point and the desired travelling path. Purely by way of example, the desired steering intervention may be performed by one or more steerable wheel(s) of the vehicle. Alternatively or additionally, a desired steering intervention may be performed by two or more crawler members of the vehicle. Accordingly, the vehicle may comprise one or more steerable wheel(s) and/or two or more crawler members.

Optionally, the desired steering intervention may be determined by use of a rear-most articulation angle required to follow the desired travelling path, which angle is based on the lateral offset between the adjusted preview point and the desired travelling path. Accordingly, the vehicle as disclosed herein may be a vehicle combination comprising one or more articulation joint(s). Further, the vehicle combination may advantageously be guided along the desired travelling path by use of the articulation angle required to follow the desired travelling path, which required articulation angle is an angle of the rear-most articulation joint. As such, a steering intervention for a vehicle combination comprising two or more articulation joints may also advantageously be determined by use of the required angle of the rear-most articulation joint.

Optionally, the vehicle may be automatically guided along the desired travelling path. Still optionally, the vehicle may be semi-automatically guided along the desired travelling path. Automatically and/or semi-automatically guided means herein that at least steering of the vehicle is performed automatically and/or semi-automatically. Semi-automatically herein means that a user may perform at least some of the guiding along the desired travelling path. Still optionally, the vehicle may be guided along the desired travelling path by use of any one or a combination of visual, audio and haptic signals provided to a user of the vehicle. The user may be an on-board or an off-board user.

According to the second aspect, the object is achieved by a control unit for guiding a vehicle during reversing along a desired travelling path, the control unit being configured to perform the steps of the method according to any of the embodiments of the first aspect of the invention. Advantages and effects of the second aspect are largely analogous to advantages and effects of the first aspect of the invention and vice versa.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor.

Where the control unit includes a programmable device such as the microprocessor, microcontroller or programmable digital signal processor mentioned above, the processor may further include computer executable code that controls operation of the programmable device. The control unit may comprise embedded hardware, sometimes with integrated software. Examples of physical relationships are:

shared casing and components mounted on one or several circuit boards. Further, the control unit may be any kind of control unit, and it may also comprise more than one control unit, i.e. the control unit may be configured by two or more sub-control units, which may be provided close to each other or be separated from each other.

According to the third aspect, the object is achieved by a vehicle, in particular a vehicle combination comprising at least one articulation joint, comprising a rear-facing sensor and a control unit according to any embodiment of the second aspect of the invention. Advantages and effects of the third aspect are largely analogous to advantages and effects of the first and second aspect of the invention and vice versa.

Optionally, the rear-facing sensor may be any one of a camera, a LIDAR (light detection and ranging), a RADAR (radio detection and ranging), a SONAR (sound navigation ranging) or the like.

According to the fourth aspect, the object is achieved by a computer program comprising program code means for performing the steps of any of the embodiments of the first aspect when said program is run on the control unit of the second aspect of the invention.

According to the fifth aspect, the object is achieved by a computer readable medium carrying a computer program comprising program code means for performing the steps of any of the embodiments of the first aspect when said program product is run on the control unit of the second aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings are schematic and not drawn to scale.

DETAILED DESCRIPTION OF EXAMPLE EMBODIMENTS OF THE INVENTION

Figure 1:
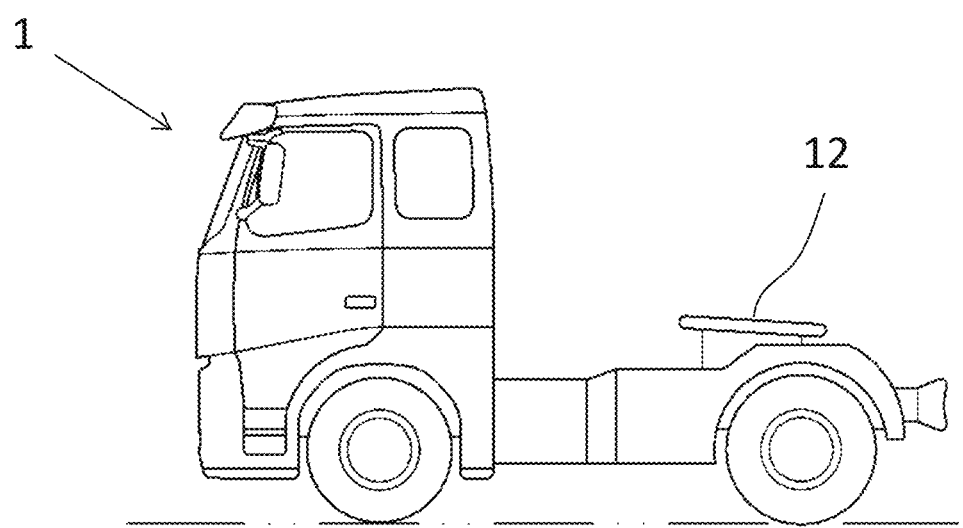
FIG. 1 is a side view of a vehicle according to an example embodiment of the present invention.

FIG. 1 shows a vehicle 1 in the form of a truck according to the third aspect of the present invention, also known as a towing truck for towing one or more trailers (not shown). The towing truck 1 comprises one coupling member 12 to which a trailer can be connected. The connection between the towing truck 1 and the trailer provides an articulation joint about which the trailer can swivel during driving. Even though a vehicle 1 in the form of a towing truck is shown, the present invention is applicable to any other type of vehicle, including other types of road vehicles and working machines. However, the present invention has shown to be especially advantageous for vehicle combinations comprising one or more articulation joint(s). This is due to the difficulty of reversing a vehicle combination where the articulation angle(s) may drastically change even by relatively small steering interventions. As such, the present invention provides improved guiding during reversing which results in more accurate steering interventions, taking the curvature of the desired travelling path into consideration for the preview distance.

Figure 2:
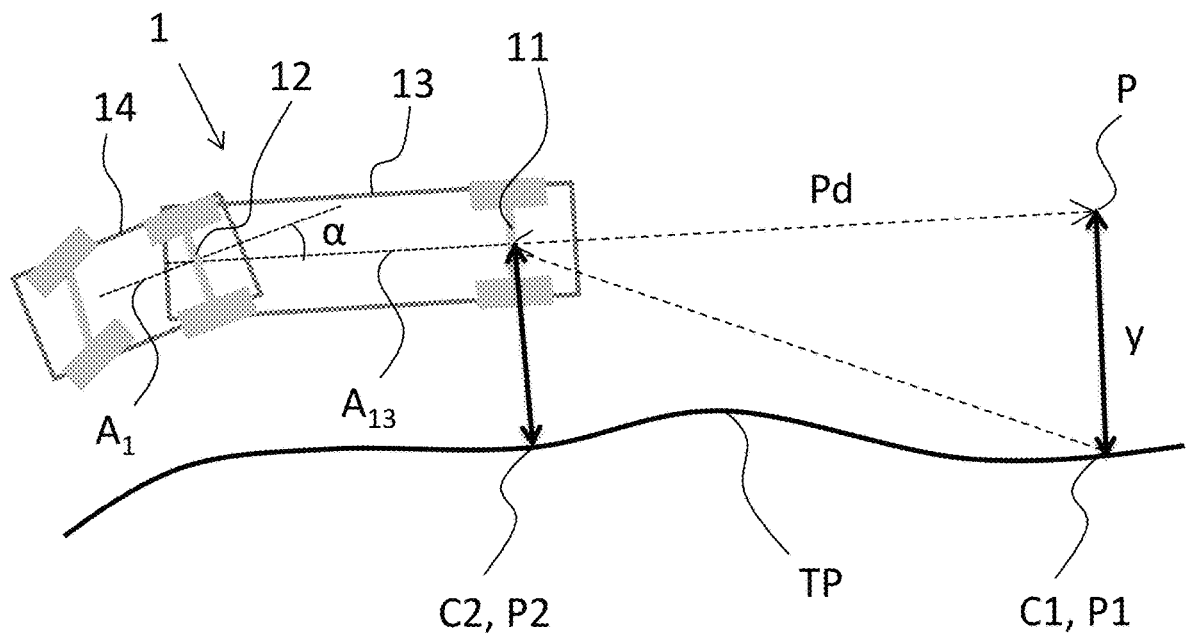
FIG. 2 is a schematic view from above of a vehicle combination which is guided during reversing along a desired travelling path according to an example embodiment of the present invention.

FIG. 2 shows a schematic view of a vehicle 1 from an above-view which comprises a trailer 13. Accordingly, FIG. 2 shows an example of a vehicle combination 1, which here comprises a towing vehicle 14 and a so called semi-trailer 13. The towing vehicle 14 comprises a coupling member 12 to which the trailer 13 is connected. As such, an articulation joint is provided between the towing vehicle 14 and the trailer 13 at the coupling member 12. In the shown embodiment, the articulation joint has a current articulation angle $\alpha$. The articulation angle $\alpha$ may for example be defined by an angle between longitudinal axes $A_1$, $A_{13}$ of the towing vehicle 14 and the trailer 13, respectively. The vehicle combination 1 is reversing and trying to follow a desired travelling path TP. According to example embodiments, the travelling path TP may be recorded during forward movement of the vehicle 1 or vehicle combination 1, the desired travelling path TP may be predefined, the desired travelling path TP may be continuously updated during reversing of the vehicle 1 or vehicle combination 1 and/or the desired travelling path TP may be continuously received by the vehicle 1 or vehicle combination 1. The desired travelling path TP may for example be a travelling path when reversing in a logistics area, a harbour or the like. Additionally or alternatively, the desired travelling path TP may be a travelling path in a narrow road section, such as a road section surrounded by obstacles, for example buildings etc. Another non-limiting example of a narrow road section is a forest road.

Figure 5:
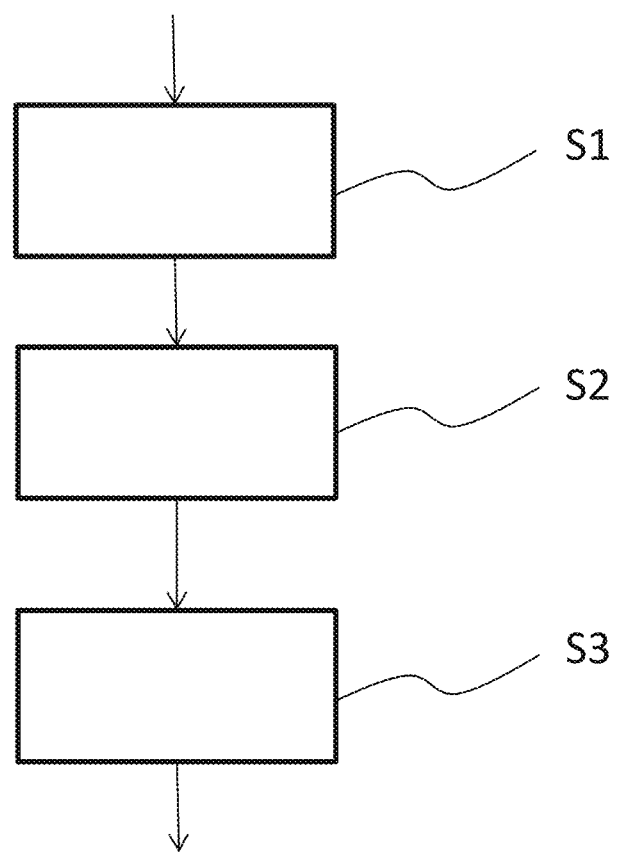
FIG. 5 is a flowchart of a method according to an example embodiment of the present invention.

With respect to e.g. FIGS. 2 and 5, a method for guiding a vehicle 1 during reversing along a desired travelling path TP according to an example embodiment will be described. The guiding is based on a lateral offset y between a preview point P located at a preview distance Pd behind the vehicle 1 and the desired travelling path TP. The preview distance Pd is here defined as a distance from a rearmost position of the trailer 13 and the preview point P. The preview point P is for example located at a preview distance Pd straight behind the vehicle 1, e.g. a point on the longitudinal axis $A_{13}$.

The method comprises:
S1) determining a curvature of the desired travelling path TP behind the vehicle 1;
S2) adaptively adjusting the preview distance Pd in dependence on the determined curvature, thereby adaptively adjusting the preview point P; and
S3) guiding the vehicle 1 along the desired travelling path TP by use of the lateral offset y between the adjusted preview point P and the desired travelling path TP.

The preview distance Pd may be adaptively adjusted so that it increases with decreasing curvature of the desired travelling path TP and decreases with increasing curvature of the desired travelling path TP. Moreover, the curvature may be determined based on a plurality of points of the desired travelling path TP.

Still further, determining the curvature may comprise:
determining a first curvature C1 at a first point P1 of the desired travelling path TP which is associated with the preview point P, determining a second curvature C2 at a second point P2 of the desired travelling path TP which is associated with a rear-most wheel axle 11 of the vehicle 1. The rear-most wheel axle 11 is here the rear-most wheel axle of the trailer 13. According to an example embodiment, the rear-most wheel axle 11 may be defined as an effective rear-most wheel axle. An effective wheel axle shall be understood as an imaginary wheel axle about which a vehicle body (in this case the trailer 13) will pivot when the vehicle body is changing its travelling direction.

In the embodiment shown in FIG. 2, the first point P1 of the desired travelling path TP is a closest point to the preview point P, and the second point P2 of the desired travelling path TP is a closest point to the rear-most wheel axle 11 of the vehicle 1. The method may further comprise selecting the largest of the first curvature C1 and the second curvature C2 as the curvature to be used for adaptively adjusting the preview distance Pd. Additionally or differently, the preview distance Pd may be adaptively adjustable in dependence on a difference between the first curvature C1 and the second curvature C2.

A largest curvature may herein mean a curvature based on one or more point(s) of the desired travelling path TP with a smallest curvature radius. Accordingly, a smallest curvature may herein mean a curvature based on one or more point(s) of the desired travelling path TP with a largest curvature radius. Furthermore, a curvature of the desired travelling path TP may be determined by a derivative of one or more point(s) on the desired travelling path TP. The curvature of the desired travelling path TP may for example also be determined by a plurality of points in a plane, i.e. an x-y plane. Additionally or alternatively, a curvature of the desired travelling path TP may be determined by use of clothoids, also known as Euler spirals.

Figure 3:
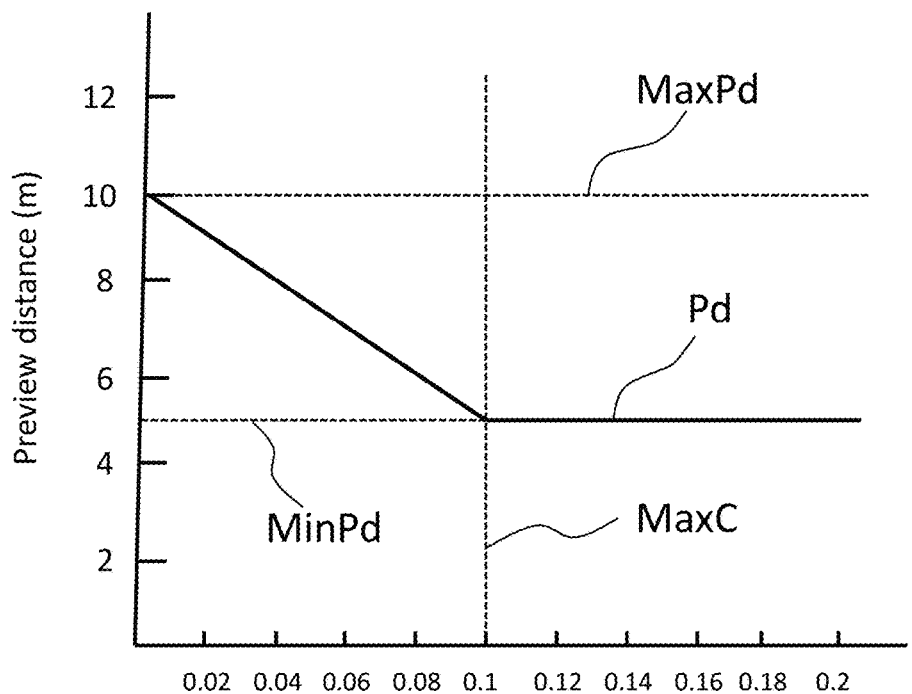
FIG. 3 is a graph showing an adaptively adjusted preview distance according to an example embodiment of the present invention.

Moreover, the preview distance Pd may be adaptively adjustable between a predefined maximum value Max Pd and/or a predefined minimum value Min Pd, as shown in FIG. 3. More particularly, FIG. 3 shows an example of how a preview distance Pd can be adaptively adjusted between a predefined maximum value Max Pd, which here is set to 10 meters (m), and a predefined minimum value Min Pd, which here is set to 5 m. In the shown embodiment, the adaptively adjustable preview distance Pd has a linear dependency on the determined curvature. The curvature is here defined as an inverse of a radius of the curvature, i.e. 1/R. Accordingly, according to an example embodiment of the present invention, the curvature is defined as an inverse of a radius of the curvature. The graph shows an example where the preview distance Pd increases linearly with decreasing curvature, i.e. when the radius of the curvature increases, and where the preview distance Pd decreases linearly with increasing curvature, i.e. when the radius of the curvature decreases. The preview distance Pd decreases linearly until a maximum value Max C of the curvature has been reached. Thus, according to an example embodiment of the present invention, preview distance Pd is configured to decrease, such as decrease linearly, until a maximum value Max C of the curvature has been reached.

Figure 4:
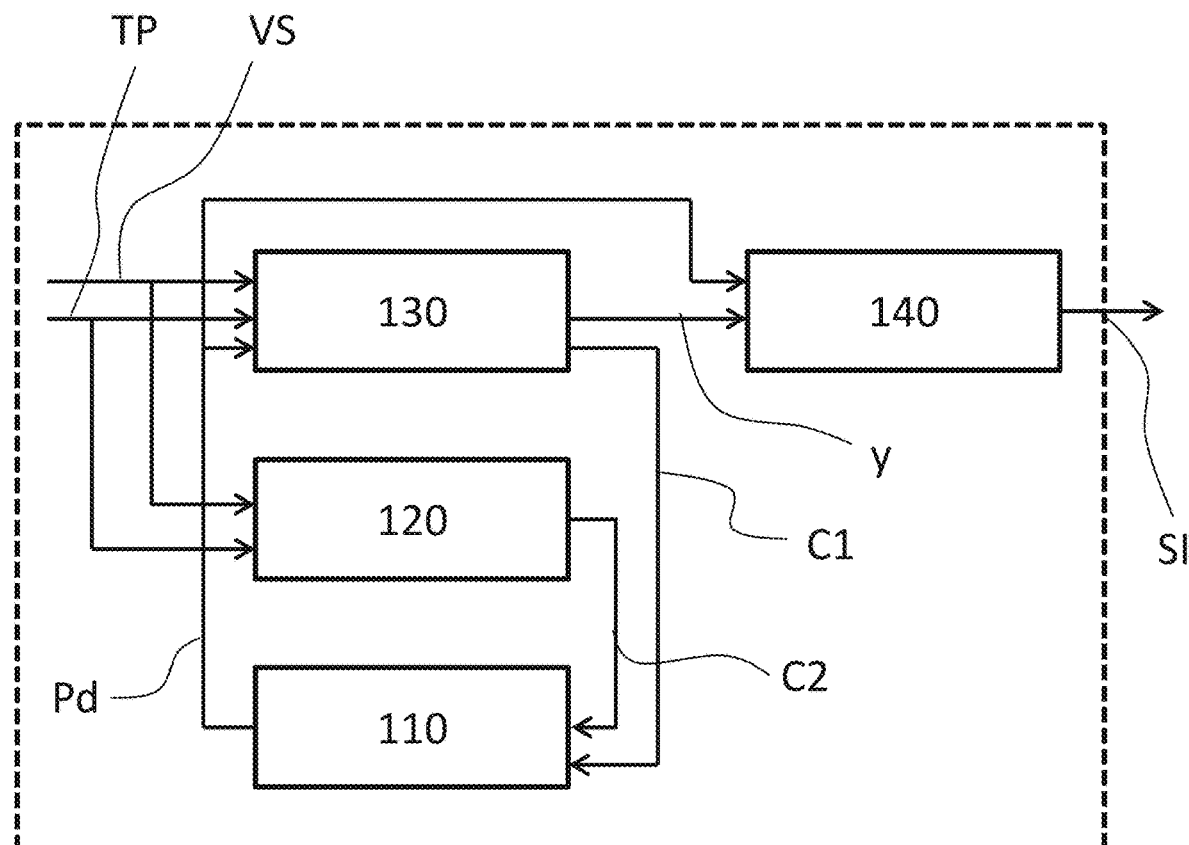
FIG. 4 is a schematic illustration of a control unit according to an example embodiment of the present invention.

FIG. 4 shows a schematic view of a control unit 100 according to an example embodiment of the second aspect of the invention. The control unit 100 is a control unit for guiding a vehicle 1 during reversing along a desired travelling path TP. The control unit 100 is configured to perform the steps of the method according to any of the embodiments of the first aspect of the invention. Further, the control unit 100 may also perform other tasks, such as the above mentioned recording of the desired travelling path TP during forward movement of the vehicle 1 and/or vehicle combination 1. Recording of the desired travelling path TP may for example be carried out by use of one or more perception sensors of the vehicle 1 and/or vehicle combination 1, such as sensors as mentioned herein, and/or by a GNSS (global navigation satellite system) or the like.

The control unit 100 comprises a lateral offset and curvature finder at preview point function, represented by the box 130. Thus, the box 130 may be configured to continuously determine the lateral offset y and the first curvature C1 associated with the preview point Pd.

The control unit 100 further comprises a curvature finder at rear-most wheel axle function, represented by the box 120. Thus, the box 120 may be configured to continuously determine the second curvature C2 associated with the rear-most wheel axle 11.

The control unit 100 further comprises a preview distance adaptation function, represented by the box 110. Thus, the function represented by box 110 may be configured to adaptively adjust the preview distance Pd in dependence on the first curvature C1 and the second curvature C2, as e.g. mentioned in the above.

The control unit 100 further comprises a steering intervention function, represented by the box 140. As such, the function represented by box 140 may comprise determining a desired steering intervention SI of the vehicle 1 to be used in order to follow the desired travelling path TP, wherein the desired steering intervention SI is based on the lateral offset y between the adjusted preview point P and the desired travelling path TP. The desired steering intervention SI may be determined by use of a rear-most articulation angle $\alpha$ required to follow the desired travelling path TP, which angle is based on the lateral offset y between the adjusted preview point P and the desired travelling path TP. The control unit 100 may thus provide an output in the form of the desired steering intervention SI. This signal from the control unit 100 may e.g. be provided to at least one steering actuator (not shown) of the vehicle 1, which at least one steering actuator may actuate one or more steerable wheels, or the like, of the vehicle 1.

The control unit 100 as shown represents a control unit of a vehicle 1 which is automatically guided along the desired travelling path TP. The control unit 100 continuously receives information about a vehicle state VS and also the control unit 100 receives information about the desired travelling path TP. The vehicle state VS may comprise information about a position and/or direction of the vehicle 1, such as a position and/or direction with respect to the desired travelling path TP. It may further comprise information about a current steering wheel angle, such as the steering wheel angle of the front wheels of the vehicle 1. It may further comprise information about a current rear-most articulation angle of the vehicle 1.

The vehicle 1, in particular a vehicle combination comprising at least one articulation joint as shown in FIG. 2, preferably comprises a rear-facing sensor (not shown) and the control unit 100 as mentioned herein.

The control unit 100 may comprise a computer program and/or a computer readable medium as disclosed herein.

It is to be understood that the present invention is not limited to the embodiments described above and illustrated in the drawings; rather, the skilled person will recognize that many changes and modifications may be made within the scope of the appended claims.

The invention claimed is:

1. A method for guiding a vehicle during reversing along a desired travelling path, wherein the vehicle is a vehicle combination comprising a towing vehicle and at least one trailer, wherein the guiding is based on a lateral offset between a preview point located at a preview distance behind the trailer and the desired travelling path, the method comprising:
   determining a curvature of the desired travelling path behind the vehicle;
   adaptively adjusting the preview distance in dependence on the determined curvature, thereby adaptively adjusting the preview point, wherein the preview distance is a distance from a rearmost position of the trailer and the preview point; and
   guiding the vehicle along the desired travelling path by use of the lateral offset between the adjusted preview point and the desired travelling path.

2. The method according to claim 1, wherein the preview distance is adaptively adjusted so that it increases with decreasing curvature of the desired travelling path and decreases with increasing curvature of the desired travelling path.

3. The method according to claim 1, wherein the curvature is determined based on a plurality of points of the desired travelling path.

4. The method according to claim 1, wherein determining the curvature comprises: determining a first curvature at a first point of the desired travelling path which is associated with the preview point, determining a second curvature at a second point of the desired travelling path which is associated with a rear-most wheel axle of the vehicle.

5. The method according to claim 4, wherein the first point of the desired travelling path is a closest point to the preview point.

6. The method according to claim 4, where the second point of the desired travelling path is a closest point to the rear-most wheel axle of the vehicle.

7. The method according to claim 4, further comprising selecting the largest of the first curvature and the second curvature as the curvature to be used for adaptively adjusting the preview distance.

8. The method according to claim 4, wherein the preview distance is adaptively adjustable in dependence on a difference between the first curvature and the second curvature.

9. The method according to claim 1, wherein the preview distance is adaptively adjustable between a predefined maximum and/or minimum value.

10. The method according to claim 1, wherein the adaptively adjustable preview distance has a linear dependency on the determined curvature.

11. The method according to claim 1, wherein guiding the vehicle along the desired travelling path comprises determining a desired steering intervention of the vehicle to be used in order to follow the desired travelling path, wherein the desired steering intervention is based on the lateral offset between the adjusted preview point and the desired travelling path.

12. The method according to claim 11, wherein the desired steering intervention is determined by use of a rear-most articulation angle required to follow the desired travelling path, which angle is based on the lateral offset between the adjusted preview point and the desired travelling path.

13. The method according to claim 1, wherein the vehicle is automatically guided along the desired travelling path.

14. A control unit for guiding a vehicle during reversing along a desired travelling path, the control unit being configured to perform the steps of the method according to claim 1.

15. A vehicle comprising at least one articulation joint, comprising a rear-facing sensor and a control unit according to claim 14.

16. A non-transitory computer readable medium carrying a computer program comprising program code for performing the steps of claim 1 when said program code is run on a control unit.

17. The method according to claim 1, wherein the preview distance behind the trailer is a point which is offset from the rearmost position of the trailer.

* * * * *